(12) United States Patent
Quayle

(10) Patent No.: US 6,317,234 B1
(45) Date of Patent: Nov. 13, 2001

(54) COMMUNICATIONS NETWORK

(75) Inventor: John Alan Quayle, Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/202,071

(22) PCT Filed: Oct. 29, 1998

(86) PCT No.: PCT/GB98/03229

§ 371 Date: Dec. 7, 1998

§ 102(e) Date: Dec. 7, 1998

(87) PCT Pub. No.: WO99/23791

PCT Pub. Date: May 14, 1999

(30) Foreign Application Priority Data

Nov. 4, 1997 (EP) .................................................. 97308857

(51) Int. Cl.[7] ...................................................... H04J 14/02
(52) U.S. Cl. .......................... 359/125; 359/135; 359/137; 359/143; 370/449; 370/443; 370/437; 370/439; 370/465; 340/825.08; 725/129; 725/94; 725/96
(58) Field of Search ..................................... 359/125, 135, 359/137, 143; 370/449, 443, 437, 439, 465; 340/825.08; 725/129, 94, 96

(56) References Cited

U.S. PATENT DOCUMENTS

| | | | |
|---|---|---|---|
| 5,136,411 | * 8/1992 | Paik et al. .............................. | 359/125 |
| 5,297,144 | * 3/1994 | Gilbert et al. ........................ | 370/95.2 |
| 5,319,488 | * 6/1994 | Ishiwatari .............................. | 359/174 |
| 5,457,689 | * 10/1995 | Marvit et al. ........................ | 370/85.8 |
| 5,677,909 | * 10/1997 | Heide ..................................... | 370/347 |
| 5,687,175 | * 11/1997 | Rochester, Jr. et al. .............. | 370/449 |
| 5,726,783 | * 3/1998 | Cooper et al. ......................... | 359/125 |
| 6,049,549 | * 4/2000 | Ganz et al. ............................ | 370/449 |

* cited by examiner

Primary Examiner—Leslie Pascal
Assistant Examiner—Hanh Phan
(74) Attorney, Agent, or Firm—Nixon & Vanderhye P.C.

(57) ABSTRACT

A communications network includes an optical waveguide to which is connected a head-end station and at lest one optical network unit (ONU). An ONU provides an interface to the communications system for connected user equipment. Data received by an ONU from connected user equipment are stored in a buffer prior to transmission to the head-end station. The head-end station is arranged to implement, in conjunction with the ONUs a demand-assignment protocol for the transfer of data upstream from the ONUs to the head-end station according to which an ONU demands upstream capacity based upon a prediction of its future capacity requirements, calculated using at least one record of earlier granted capacity by the head-end station and at least one measurement of a quantity of data awaiting transmission to the head-end station in the buffer of the ONU.

8 Claims, 2 Drawing Sheets

COMMUNICATIONS NETWORK

BACKGROUND OF THE INVENTION

1. Field of the Invention

This invention relates to communications networks, and has particular utility in relation to Passive Optical Networks (PONs).

2. Related Art

PONs are commonly used in point to multi-point communications applications, for example in a broadband local access optical network providing broadband services to residential and small business users. In a PON providing a point to multi-point local access optical network, a so called optical line termination unit (OLT) is provided, connected to the "head end" of the PON and located, typically, in a local telephone exchange. The OLT controls access to the shared capacity of the PON and interconnects the PON with a wider telecommunications network. So called optical network units (ONUs) are connected to the "user ends" of the PON, typically up to 10 km downstream from the OLT, to provide points of connection to users, to multiplex services and to communicate over the PON with the OLT.

Conventionally, data are passed over the PON between an ONU and the OLT according to a predetermined packet structure, data being multiplexed within that predetermined structure for the particular service being provided to a user. Data interchanges between OLT and ONU take place under the centralised control of the OLT using a predetermined protocol, designed to ensure that the available capacity of the PON is shared equitably between the connected ONUs and between the various services being carried. Data passing "upstream" over the PON from ONUs to the OLT are typically multiplexed according to a Time Division Multiple Access (TDMA) technique in which data channels are separated in time to avoid collision at the OLT. PONs employing a TDMA multiplexing technique are known as TDMA PONs. Various protocols, known as Media Access Control (MAC) protocols, have been developed to control an ONU's upstream access to the shared capacity on a PON. MAC protocols may implement the TDMA multiplexing scheme in the upstream direction, or they may implement other packet-based data transfer schemes more appropriate to especially high data rates or to a variable rate asymmetric data transport.

A typical "star" PON configuration does not permit ONUs to communicate directly with each other and to decide among themselves which one will next be allowed to send data upstream to the OLT. PON MAC protocols therefore tend to be controlled by the centralised OLT rather than that control being distributed amongst the ONUs.

Typically, MAC protocols implement two main types of control policy in the allocation of capacity for the upstream transfer of data packets from an ONU to the OLT—"Fixed Assignment" and "Demand Assignment" based upon ONU buffer fullness.

Under a fixed assignment policy a static allocation of capacity is made at the time of call set-up by a user via an ONU so that the same number of data packets may be sent from the ONU to the OLT each time the ONU's time slot arrives for transfer of its upstream data. In some time slots, not all the allocated capacity may be used by the ONU, while in others the ONU may have more packets in its buffer than the allocation will allow to be transmitted in that cycle, leading to packet delay. A demand assignment policy, on the other hand, allows the allocation of capacity to ONUs to vary according to demand, making more efficient use of the PON.

A number of protocols have been developed incorporating the demand assignment policy, or variations on the theme. For example, with a polled pipeline protocol, demand for capacity by ONUs may be determined by the OLT by means of a process in which each ONU is polled in turn by the OLT for a specified maximum number of upstream data packets, the ONU including with any transferred data a message requesting that a specified number of data packets of upstream capacity be reserved for its next upstream slot during the next polling cycle. The capacity requested by the ONU is typically equal to the number of packets awaiting transmission in the ONU's buffer. Alternatively, the ONUs may send reservation messages to the OLT to increase or decrease capacity assigned, as and when required. In either case, the OLT makes a reservation for that ONU in an overall assignment schedule for the PON based upon the requested capacity, although allocations of capacity to a particular ONU by the OLT may be subject to ceilings during periods of heavy demand for capacity to ensure fair allocation across ONUs and to ensure that appropriate priority is given, for example, to low bit rate telephony services. In such circumstances, data packets can be delayed if they arrive in the ONU's buffer between the time of the last request for capacity by the ONU and the time of the ONU's next upstream slot. There are then more packets in the ONU's buffer than the ONU had asked to send in that slot. This situation may continue for several cycles until the data arrival rate drops.

Some protocols are for example, disclosed in Karlsson JM et al: "Adaptive Polling Schemes for an ATM bus with bursty arrivals", Computer Networks and ISDN systems; vol. 24, no. 1, Mar. 1, 1992, pages 93–103, x p000250094.

MAC protocols attempt to implement a control policy capable of coping with changes in demand for service by ONUs. PONs may carry many types of service traffic, from low bit rate synchronous services to variable high bit rate 'data' services. Protocols attempt to allocate capacity fairly so that, for example, a low rate voice connection is not delayed, causing echo, by a demand for a high rate data service. With advanced PONs, using fibre amplifiers to increase the length, number of branches and data rate, the demands on the protocol are greater, being called upon to cope with potentially thousands of simultaneous calls, longer round-trip delays due to the greater reach of the PON and to be able to multiplex many different fixed and variable rate service types. Thus, the choice of MAC protocol may have a great influence on the performance of the network.

BRIEF SUMMARY OF THE INVENTION

According to a first aspect of the invention there is provided a communications network comprising:

- a head-end station;
- an optical network unit having user equipment connected thereto, said optical network unit being linked to the head-end station by means of an optical waveguide and including a buffer to store data received from said user equipment;
- wherein the head-end station includes control means arranged to control the transmission of data by the optical network unit to the head-end station over said waveguide, said control means being responsive, on receipt of a request message transmitted by the optical network unit indicative of the quantity of data intended to be sent therefrom, to transmit to the optical network unit a polling message including an indication of the quantity of data that the optical network unit is permitted to send to the head-end station;
- wherein the optical network unit includes means responsive, on receipt of the polling message, to transmit, from the buffer to the head-end station over said waveguide, a quantity of data less than or equal to the permitted quantity indicated by said polling message, and wherein the optical network unit is arranged to calculate the data quantity to be specified in the request message to the head-end station using at least one measurement of buffer fullness in combination with at least one-indication of a permitted quantity of data.

Embodiments of the invention enable an ONU to make a prediction of the quantity of data it is likely to have in its buffer when its next upstream slot arrives—and hence to make an appropriate pre-emptive request for upstream capacity—based upon a record of the quantity held in its buffer at one or more instants in time during the latest or earlier upstream slots and an account of permitted upstream capacity by the OLT. Data arrival in the ONU's buffer, and hence fullness of the buffer, does not change in a purely random way—the changes tend to be gradual. By taking account of the variation in the rate at which data arrives and leaves its buffer over a number of reset cycles, an ONU is often able to made a better estimate of buffer fullness for the next upstream slot, at the time it submits its request for capacity, than under a conventional demand-based allocation scheme in which a request for upstream capacity is based simply on the quantity of data actually in the buffer at the time of submitting the request. The rate at which data arrives may be derived from observations of the quantity of data held in the buffer (the "buffer fullness") at particular instants in time during the latest and earlier reset cycles. The quantity of data leaving the buffer as data transmitted upstream by the ONU to the OLT, is defined in general by the upstream capacity assigned to the ONU by the OLT. If sufficient data is awaiting transmission in the buffer it is assumed that the ONU transmits the maximum permitted data quantity indicated by the polling message.

By submitting pre-emptive requests for upstream capacity based upon predictions of future capacity requirements, embodiments of the invention offer the chance to minimise delay, and variation in the delay to upstream data transmission for some or all of the services being transported by the PON. This may improve both the quality of individual services and the overall efficiency of the PON. In particular, minimising data delay variation is known to be important for maintaining the quality of constant bit rate services, voice services for example.

According to embodiments of the present invention, more or less sophisticated algorithms may be incorporated in each ONU to predict future buffer fullness based upon a recent history of buffer fullness and permitted upstream capacity. As a secondary benefit, the ability for example to pre-empt a reduced requirement in a future cycle helps to minimise wastage of assigned capacity and releases capacity to other ONUs earlier than may have been possible with a conventional demand assignment protocol. This helps to minimise delays to transmission of data in subsequent cycles, particularly during times of high PON utilisation, so increasing the overall efficiency of the PON.

According to a second aspect of the invention there is provided a communications network comprising:

a head-end station;

an optical network unit having user equipment connected thereto, said optical network unit being linked to the head-end station by means of an optical waveguide and including a buffer to store data received from said user equipment;

wherein the head-end station includes control means arranged to control the transmission of data by the optical network unit to the head-end station over said waveguide, said control means being arranged to transmit to the optical network unit a polling message including an indication of the quantity of data that the optical network unit is permitted to send to the head-end station;

wherein the optical network unit includes:

means responsive, on receipt of the polling message, to transmit, from the buffer to the head-end station over said waveguide, a quantity of data less than or equal to the permitted quantity indicated by said polling message; and means to generate a message for transmission to the head-end station indicative of a quantity of data held in the buffer; and wherein the head-end station is arranged to calculate the permitted data quantity to be specified in the polling message to the optical network unit using at least one indication of buffer fullness by the optical network unit in combination with at least one measurement of a permitted quantity of data.

In some PONs, it may prove advantageous to centralise the algorithms for prediction of future ONU capacity requirements at the OLT. This incurs a greater processing overhead on the OLT, but advantages may accrue from the access that the OLT has to information from all the ONUs connected to the PON. Rather than sending requests to the OLT for capacity already calculated using a prediction algorithm, an ONU may simply supply factual information to the OLT regarding buffer fullness at the time of its upstream transmission slot, for example, and allow the OLT to perform the calculation of expected capacity requirements using that information and information made available over previous cycles. Besides minimising variation in data transmission delay at an ONU, algorithms centralised in the OLT may enable a PON to recover more quickly from periods of very high loading during which data may have been delayed at ONUs, the OLT potentially being able to optimise the recovery for the benefit of the whole PON more quickly than if some of the functionality required were devolved to the ONUs. In such an arrangement, the OLT has the benefit of knowing the actual buffer fullness of each ONU, rather than being presented with a series of demands for capacity which may or may not correspond to actual buffer fullness at that time.

In a PON arranged to carry Asynchronous Transfer Mode (ATM) traffic, a so called "APON", capacity is allocated to the ONU on the basis of a number of ATM cells, up to the number requested by the ONU for transmission during a particular upstream slot. An ATM cell is 53 bytes long, of which 5 bytes are the cell header and 48 bytes the ATM payload. Preferably, the optical communications system is arranged to carry ATM traffic.

Whereas a typical local access network PON may be arranged in a "star" configuration, split into branches connecting, for example, up to 32 ONUs, each located up to 10 km downstream from the OLT, the inclusion of optical fibre amplifiers and repeaters enables a so called "advanced PON" to be created having, potentially, a very much larger optical split, of the order of thousands of branches and with a reach of several hundred kilometers. Ring or other mixed configurations may also be used in embodiments of the invention.

According to a third aspect of the invention there is provided an optical network unit connected, in use, to a communications network and to user equipment, the communications network including an optical waveguide having a head-end station connected thereto, the optical network unit comprising:

buffer means for the storage of data received from the user equipment;

means responsive to a polling message, received over said optical waveguide from the head-end station, being indicative of a quantity of data that the optical network unit is permitted to send to the head-end station, to transmit from the buffer means to the head-end station, over said optical waveguide, a quantity of data less than or equal to the permitted quantity indicated by the polling message; and means to generate a request message indicative of a quantity of data that the optical network unit intends to send to the head-end station, and to transmit the request message to the head-end station over said optical waveguide;

wherein the optical network unit further comprises means to calculate the quantity of data to be indicated by said request message using at least one measurement of earlier buffer fullness in combination with at least one indication of a permitted quantity of data.

According to a fourth aspect of the invention there is provided a method of transferring data between a head-end station and an optical network unit, connected together by an optical waveguide, comprising the steps of:

(1) generating, at the head-end station, a polling message including the identity of an optical network unit and an indication of a quantity of data that the identified optical network unit is permitted to send to the head-end station, and transmitting the polling message over the optical waveguide;

(2) on receiving the polling message, the optical network unit identified therein transmitting to the head-end station, over said optical waveguide, a quantity of data less than or equal to the permitted quantity indicated by said polling message;

(3) said optical network unit generating a request message indicating a quantity of data intended for transmission from said optical network unit to the head-end station, and transmitting the request message to the head-end station over the optical waveguide;

wherein the quantity of data indicated by said request message is calculated by the optical network unit using at least one measurement of earlier buffer fullness in combination with at least one indication of a permitted quantity of data.

DETAILED DESCRIPTION OF EXEMPLARY EMBODIMENTS

Embodiments of the invention will now be described in more detail, by way of example only, with reference to the accompanying drawings in which.

Figure 1:
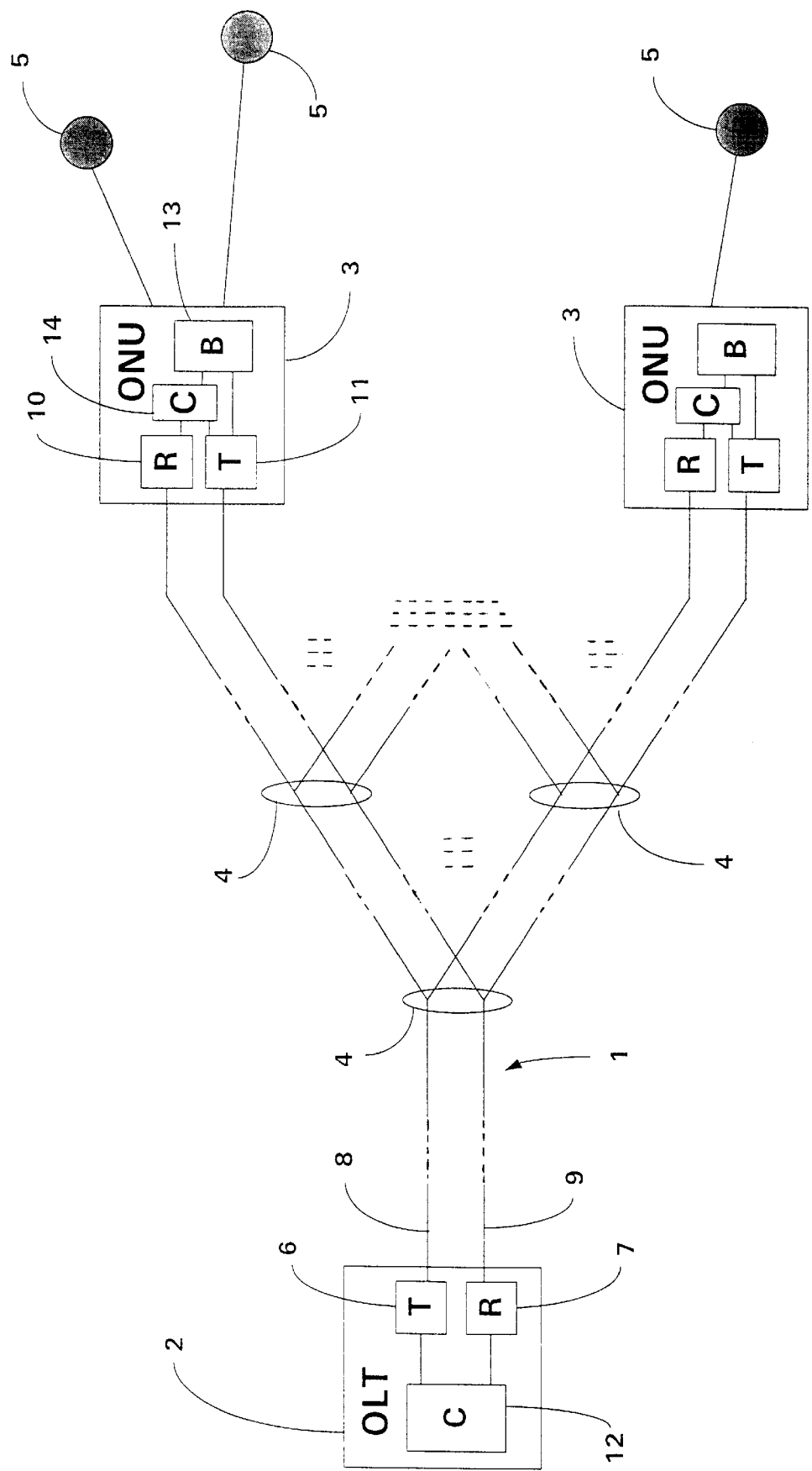
FIG. 1 shows the configuration of a typical known local access PON.

Referring to FIG. 1, a section of a typical known local access PON having a "star" configuration is shown, including an optical waveguide 1, an optical line termination unit (OLT) 2 connected to the "head-end" of the optical waveguide 1, a number of optical network units (ONUs) 3, each connected to the end of a branch—a "user end"—split from the waveguide 1 by one or more passive optical splitters 4, two levels of split being shown in FIG. 1. ONUs 3 provide an interface to the PON for user equipment 5, connected to ONUs 3 typically by non-optical connection means. The OLT 2 includes an optical transmitter 6 and an optical receiver 7, each connected to the optical waveguide 1. The waveguide 1 of FIG. 1 is shown having separate transmit and receive paths, 8 and 9 respectively, with respect to the OLT, the transmit path 8 being connected to the optical transmitter 6 and the receive path 9 being connected to the optical receiver 7. Each ONU 3 includes an optical receiver 10 connected to the respective split branch of the transmit path 8 of the waveguide 1 and an optical transmitter 11 connected to the respective split branch of the receive path 9 of the waveguide 1. In practice, however, rather than providing separate transmit and receive paths, a single optical fibre may be provided as the waveguide 1 to carry traffic in both directions simultaneously, the transmitters (6, 11) and receivers (7, 10) being connected to the same optical fibre, signals of a different wavelength being used in each direction.

The OLT 2 of FIG. 1 is shown to include a control unit 12, connected to the OLT's transmitter 6 and receiver 7, arranged to control access to the shared capacity of the waveguide 1 by implementing a predetermined protocol for communication over the waveguide 1 in co-operation with a control unit 14 installed in each of the ONUs 3. Data received from user equipment 5 are typically assembled into packets by the respective ONU 3, according to a PON-specific packet structure, and stored in a buffer 13 within that ONU 3 ready for transmission upstream over the waveguide 1 to the OLT 2 under the control of the protocol by the OLT 2 and the respective control unit 14 of the ONU 3. For example, in a local access PON carrying Asynchronous Transfer Mode (ATM) traffic—an "APON"—the data packets are ATM cells of 53 bytes in length, comprising a 5 byte ATM header followed by a 48 byte ATM payload. In other types of PON, the OLT 2 and the ONUs 3 may use a different packet structure to multiplex services.

Preferably, a polled demand assignment protocol may be implemented, by the control unit 12 of the OLT 2 in co-operation with control units 14 of the ONUs 3, in which the OLT 2 cyclically polls each of the ONUs 3 in turn for data to be transmitted upstream by each ONU 3 in its respective polling slot. During each polling cycle, known as a "reset cycle", the control unit 12 arranges, typically, to poll every connected ONU 3 once, providing the opportunity for the ONU 3 to transmit a permitted number of data packets, ATM cells for example, upstream to the OLT 2 from its buffer 13.

Figure 2:
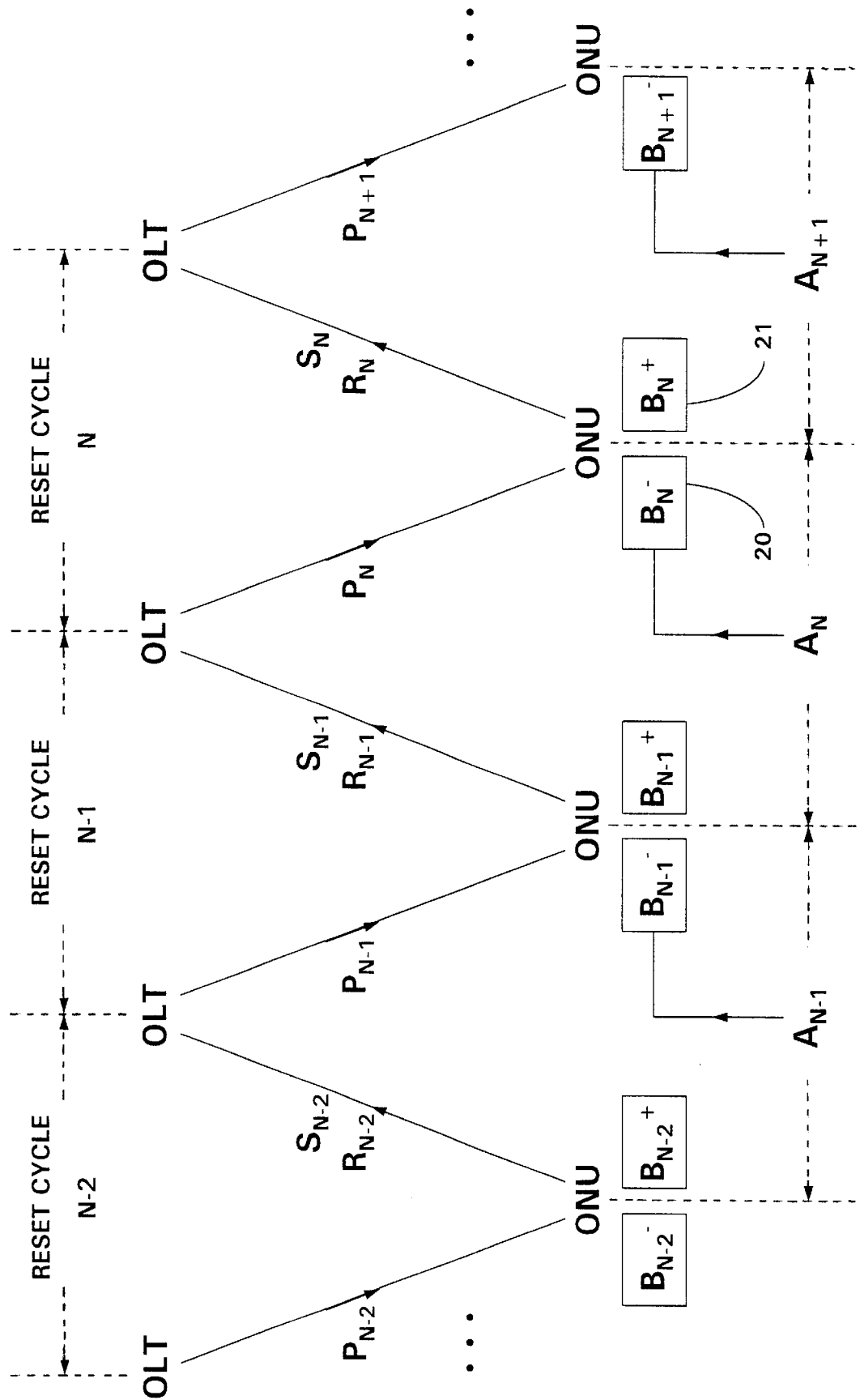
FIG. 2 shows the parameters of a polling sequence used in preferred embodiments of the invention.

Referring to FIG. 2, a series of interactions between the OLT and a particular ONU is shown, as may occur with a typical demand assignment protocol, over a number of polling (reset) cycles. A reset cycle begins with the OLT sending of a polling message to the ONU including an indication of permitted upstream capacity—the quantity of data that the ONU may transmit to the OLT in response to the polling message—assigned to that ONU for that reset cycle. The ONU responds by transmitting a quantity of data to the OLT less than or equal to the permitted quantity, accompanied by a message including a request to the OLT to grant permission for the ONU to transmit a particular quantity of data during the next reset cycle. For example, in FIG. 2, RESET CYCLE N begins with the OLT sending a polling message addressing the particular ONU, including an indication that the ONU may respond by transmitting a maximum permitted quantity of data $P_N$ to the OLT during that reset cycle. The quantity of data $P_N$ is determined by the control unit 12 of the OLT according to an upstream capacity assignment schedule maintained for the PON by the control unit 12, defining the upstream capacity to be assigned to each ONU during each reset cycle. In constructing the assignment schedule, the OLT takes account of demand for access by others ONUs connected to the PON and of a need to ensure fair access to PON capacity among ONUs and among the different service types being transported by the PON.

On receipt of the polling message from the OLT, the ONU transmits, from its buffer 13 via transmitter 11 under the control of its control unit 14, a quantity of data $S_N$ to the OLT where $S_N=P_N$. Accompanying the transmitted data, the ONU sends a request message to the OLT including an indication of a quantity of data $R_N$ that the ONU seeks permission to transmit to the OLT during the next reset cycle, RESET CYCLE N+1. On receipt by the control unit 12 of the OLT, the request for capacity $R_N$ by the ONU is assessed in the light of capacity requests by other ONUs, and the resultant assignment, in this example $P_{N+1}$, is entered into the assignment schedule for the next reset cycle, RESET CYCLE N+1.

Immediately prior to upstream transmission during RESET CYCLE N, the buffer fullness in the ONU is indicated in BOX 20 of FIG. 2 as $B_N^-$. At the moment immediately following upstream transmission by the ONU, the buffer fullness is indicated in BOX 21 as $B_N^+$, representing the quantity of data delayed in the ONU's buffer until the next reset cycle. From the moment immediately after the ONU transmitted data to the OLT during the previous reset cycle, RESET CYCLE N−1, and the moment immediately prior to upstream transmission during the current cycle, RESET CYCLE N, a quantity of data $A_N$ arrived in the ONU buffer from connected user equipment, where $$A_N = B_N^- - B_{N-1}^+ \tag{1}$$

It is assumed in this example that no data arrives in the ONU buffer during the short time when data is being transmitted from the ONU to the OLT. It is also assumed that the ONU transmits the maximum permitted quantity of data to the OLT when the opportunity arises or, if the permitted quantity exceeds the buffer fullness at that time, the ONU transmits all the data actually awaiting transmission in the buffer. It then follows that the quantity of data being delayed in the buffer after upstream transmission during RESET CYCLE N is $$B_N^+ = B_N^- - S_N \geq B_N^- - P_N \tag{2}$$

The ONU may therefore note the buffer fullness at particular times—in the example of FIG. 2, immediately before and immediately after upstream transmission—and from this information deduce from formula (1) above the quantity of data arriving at the buffer during each reset cycle. Further, to enable a pre-emptive prediction to be made of the likely requirement for upstream capacity during the next reset cycle, the permitted capacity assigned for at least the current reset cycle may be used to ensure that the quantity of delayed data is known, from formula (2), at the time of making the pre-emptive prediction. Thus, embodiments of the invention may use a knowledge of both buffer fullness and permitted upstream capacity over one or more reset cycles to make a prediction of future buffer fullness, prior to upstream transmission, and hence to make appropriate pre-emptive requests for upstream capacity.

In conventional PONs, a request for upstream capacity is based solely on the quantity of data held in the ONU's buffer immediately prior to assembling and transmitting the request message to the OLT. Thus, for example in FIG. 2, the quantity of data indicated by the request message sent during RESET CYCLE N would be $R_N=B_N^-$ under a conventional scheme. However, a conventional scheme suffers the disadvantage that no account is taken of the actual upstream capacity assigned to the ONU for the next reset cycle when requesting future upstream capacity. If there were to be a shortfall in the permitted upstream capacity compared to that requested, e.g. $P_N<R_{N-1}$, then a request based only upon the latest buffer fullness, $B_N^-$ in this example, would not allow the ONU to pre-empt the effect of the shortfall and to take action to minimise future data transmission delay or delay variation. Further, under a conventional scheme, because singular measures of the latest buffer fullness convey little information about trends of increasing or decreasing rate of arrival of data from connected user equipment, an ONU is not able to pre-empt a predictable increase or decrease in data arrival rate when making a request for upstream capacity.

According to embodiments of the invention, instead of requesting upstream capacity using only the latest buffer fullness, the control unit 14 of an ONU may be modified to perform a pre-emptive calculation to predict the likely buffer fullness during the next reset cycle and to request upstream capacity, $R_N$ for example, based upon the result of that calculation. Such a calculation may be based upon any combination of one or more readings of buffer fullness and of permitted upstream capacity. If readings from earlier reset cycles are to be used in a calculation, the control unit 14 of the ONU may be arranged to store as many earlier readings as necessary, for example in memory as a rolling record of readings from the preceding x reset cycles.

By way of example, some simple formulae for use by embodiments of the invention in pre-emptive calculations will now be discussed using the terms introduced by FIG. 2. For example, the control unit 14 of an ONU 3 in a preferred embodiment may perform a calculation during RESET CYCLE N to predict that by the time its polling slot arrives during the next reset cycle, N+1, the buffer 13 will contain a quantity of data equal to the latest buffer fullness $B_N^-$, at the instant before transmitting data to the OLT 2, plus the difference between that buffer fullness and the quantity of data $P_N$ that the ONU 3 is permitted to transmit during the current reset cycle N. Therefore the control unit 14 assembles a request message requesting a quantity $R_N$ of upstream capacity where $$R_N = B_N^- + B_N^- - P_N \tag{3}$$

subject to a minimum request of zero upstream capacity.

Formula (3) modifies the behaviour of the control unit 14 of a conventional ONU to take account of differences between the permitted upstream capacity and the current buffer fullness and hence of data transmission delay (from Formula (2) above). The observed difference is added to the latest buffer fullness by way of an adjustment when requesting upstream capacity for the next reset cycle. Formula (3) may be extended to use, alternatively, the rolling average (rounded to the nearest integer) of those observed differences (delays) over a sequence of the preceding x reset cycles, rather than that of only the latest reset cycle N, so that:

$$R_N = B_N^- + \text{ROUND}\left\{\frac{1}{x}\sum_{i=N-x+1}^{N}(B_i^- - P_i)\right\} \tag{4}$$

where ROUND{ } represents a function to round the quantity resulting from the calculation within the bracket to the nearest integer value.

Formula (4) has the effect of "smoothing" the adjustment to the latest buffer fullness from one reset cycle to the next by taking account of a history of delays rather than just the latest delay. This can help to reduce data delay variation compared with Formula (3) in which an immediate and full adjustment is made to compensate for an observed delay which may, predictably, either not be fully necessary or may indeed be inadequate given the average delay over the preceding reset cycles. The requested capacity of Formula (4) is again subject to a minimum request of zero, although the portion of the formula in the brackets { } may be negative.

Alternatively, predictive calculations may take account of the rate at which data arrives in the ONU buffer 13 over one or more reset cycles, and any variation in that rate. By Formula (1) above, data arrival rate may be deduced from the difference between the latest buffer fullness and that immediately following the preceding data transmission. By observing the way in which data arrival rate changes over a sequence of reset cycles, a prediction of data arrival rate for the next reset cycle may be made by adjusting the latest observed data arrival rate by a predictable amount. Thus, the change in buffer fullness up to the moment of the next upstream data transmission may be predicted. For example, in the simplest case, the control unit 14 may predict that the same quantity of data will arrive at the buffer 13 (adding to any delayed data) during the next reset cycle N+1, so that a request may be made for upstream capacity according to the formula $$R_N = B_N^+ + A_N$$

This may be expressed in terms of buffer fullness and permitted capacity, by Formulae (1) and (2), as $$R_N = 2B_N^- - B_{N-1}^+ - P_N \qquad (5)$$

A more complex formula may make an adjustment to the arrival rate based upon the change in arrival rate since the preceding reset cycle N-1, so that $$R_N = B_N^+ + A_N + A_N - A_{N-1}$$

which becomes, by Formulae (1) and (2), $$R_N = 3B_N^- - 2B_{N-1}^+ - B_{N-1}^- + B_{N-2}^+ - P_N \qquad (6)$$

subject to a minimum request of zero.

A further level of smoothing to the adjustment in data arrival rate may be made by taking the average difference in data arrival rate over the latest x reset cycles, so that $$R_N = B_N^- + A_N + \text{ROUND}\left\{\frac{1}{x}\sum_{i=N-x+1}^{N}(A_i - A_{i-1})\right\} \qquad (7)$$

which, by Formulae (1) and (2) may be expressed entirely in terms of buffer fullness and permitted data quantity.

More complex formulae may be implemented to predict the quantity of data likely to be awaiting transmission from the ONU's buffer 13 to the OLT 2 at the time of the next upstream data transmission opportunity. For example, a statistical model of buffer fullness may be developed over a sequence of reset cycles, the model being constantly updated as new measures or indications of buffer fullness and assigned upstream capacity are observed.

Preferably, in another arrangement, the calculation of future capacity requirement of an ONU may be performed by the control unit 12 of the OLT 2 itself, using information supplied by the ONU regarding its buffer fullness at one or more particular moments during the latest reset cycle, rather than by the control unit 14 of the ONU 3 itself. In such an arrangement, the information supplied by an ONU in the so called "request message" may, instead of being a request for capacity, $R_N$ for example during RESET CYCLE N, simply comprise factual information as to, for example, the latest buffer fullness $B_N^-$ of that ONU 3. The control unit 12 of the OLT 2 may then employ a suitable calculation algorithm, using formulae adapted from Formulae (1) to (6) for example, arranged to determine the permitted quantity of data to be specified in the next polling message to the respective ONU 3. The OLT 2 already possesses information about previous permitted data quantities in respect of a particular ONU. These data quantities, in combination with information transmitted by that particular ONU regarding its buffer fullness, may be used to predict the ONU's future upstream capacity requirements and hence the quantity of data to include in the next polling message to the ONU. For example, Formula (3) may be adapted for use by the control unit 12 of the OLT 2 so that, following receipt of a message from an ONU during RESET CYCLE N indicating that the latest ONU buffer fullness is $B_N^-$, the OLT 2 may respond by sending a polling message to the ONU specifying that the permitted data quantity $$P_{N+1} = B_N^- + B_N^- - P_N \qquad (7)$$

may be transmitted by the ONU during RESET CYCLE N+1.

In certain circumstances, prediction of future upstream data capacity requirements of ONUs by the OLT 2 may lead to more efficient PON utilisation than if prediction calculations were devolved to the ONUs. This may be the case, in particular, at times of heavy PON loading when the OLT may advantageously be able to take account of the effect, on overall PON efficiency and quality of service, of imposing ceilings in the permitted capacity to particular ONUs. Through optimising an upstream capacity assignment schedule, as maintained by the control unit 12 of the OLT 2, using all the information available, the control unit 12 of the OLT 2 may be able to maximise the rate of recovery from a period of heavy demand, minimising delay in data transmission and in delay variation between reset cycles for all the ONUs in the PON, maximising quality of service as the demand for capacity subsides.

However, under certain circumstances, it may be advantageous to devolve some of the processing overhead associated with operation of the PON protocol from the control unit 12 of the OLT 2 to the control units 14 of the ONUs 3. In particular, processing associated with predictor algorithms may be borne by ONUs where the principal use of the PON is as an asymmetric data transport, for example as used for "video on demand" applications. Such applications may place lower demands on the OLT 2 in the upstream direction, the main loading being in the downstream delivery of the replay data from the selected video recordings. In such applications the OLT 2 may be best suited as the location for predictor algorithms according to embodiments of the invention. However, where high speed data applications with variable rate data transfers in the upstream direction are competing for upstream capacity with constant low bit rate voice services operating within quality of service constraints, the OLT 2 may be particularly heavily loaded in maintaining control over capacity allocations and assigning appropriate priority to demands from ONUs carrying different service types. In such applications, any devolvement in the processing overheads to ONUs, operation of predictor algorithms for example, may offer some advantages.

Although in the above described embodiments the communications links comprise optical fibre, other embodiments in which both optical fibre and other physical media, such as copper pairs and coaxial cable may also be included in the network.

What is claimed is:

1. A communications network comprising:

a head-end station;

an optical network unit having user equipment connected thereto, said optical network unit being linked to the head-end station by means of an optical waveguide and including a buffer to store data received from said user equipment;

wherein the head-end station includes control means arranged to control the transmission of data by the optical network unit to the head-end station over said waveguide, said control means being responsive, on receipt of a request message transmitted by the optical network unit indicative of the quantity of data intended to be sent therefrom, to transmit to the optical network unit a polling message including an indication of the quantity of data that the optical network unit is permitted to send to the head-end station;

wherein the optical network unit includes means responsive, on receipt of the polling message, to transmit, from the buffer to the head-end station over said waveguide, a quantity of data less than or equal to the permitted quantity indicated by said polling message, and wherein the optical network unit is arranged to calculate the data quantity to be specified in the request message to the head-end station using at least one measurement of buffer fullness in combination with at least one indication of a previously permitted quantity of data.

2. A communications network as in claim 1 wherein the optical network unit is arranged to assemble data as data packets assembled according to a predetermined packet structure for transmission to the head-end station, and the head-end station is arranged to receive such data.

3. A communications network as in claim 1 wherein data transmitted by the optical network unit to the head-end station is multiplexed according to a time division multiple access (TDMA) protocol.

4. A communications network as in claim 1 wherein said at least one measurement of buffer fullness and said at least one indication of a permitted quantity of data are selected by selection means to enable the ONU to calculate a quantity of data to be delayed in the buffer as a result of transmission of a permitted quantity of data to the head-end station and to include said calculated quantity of delayed data in the calculation of the data quantity to be specified in the request message.

5. A communications network as in claim 1 wherein said at least one measurement of buffer fullness and said at least one indication of a permitted quantity of data are selected by selection means top enable the ONU to calculate a quantity of data received from said user equipment and to include said calculated quantity of received data in the calculation of the data quantity to be specified in the request message.

6. A communications network comprising:

a head-end station;

an optical network unit having user equipment connected thereto, said optical network unit being linked to the head-end station by means of an optical waveguide and including a buffer to store data received from said user equipment;

wherein the head-end station includes control means arranged to control the transmission of data by the optical network unit to the head-end station over said waveguide, said control means being arranged to transmit to the optical network unit a polling message including an indication of the quantity of data that the optical network unit is permitted to send to the head-end station;

wherein the optical network unit includes:

means responsive, on receipt of the polling message, to transmit, from the buffer to the head-end station over said waveguide, a quantity of data less than or equal to the permitted quantity indicated by said polling message; and means to generate a message for transmission to the head-end station indicative of a quantity of data held in the buffer; and wherein the head-end station is arranged to calculate the permitted data quantity to be specified in the polling message to the optical network unit using at least one indication of buffer fullness by the optical network unit in combination with at least one indication of a permitted quantity of data.

7. An optical network unit connected, in use, to a communications network and to user equipment, the communications network including an optical waveguide having a head-end station connected thereto, the optical network unit comprising:

buffer means for the storage of data received from the user equipment;

means responsive to a polling message, received over said optical waveguide from the head-end station, being indicative of a quantity of data that the optical network unit is permitted to send to the head-end station, to transmit from the buffer means to the head-end station, over said optical waveguide, a quantity of data less than or equal to the permitted quantity indicated by the polling message; and means to generate a request message indicative of a quantity of data that the optical network unit intends to send to the head-end station, and to transmit the request message to the head-end station over said optical waveguide;

wherein the optical network unit further comprises means to calculate the quantity of data to be indicated by said request message using at least one measurement of buffer fullness in combination with at least one indication of a permitted quantity of data.

8. A method of transferring data between a head-end station and an optical network unit, connected together by an optical waveguide, comprising the steps of:

(1) generating, at the head-end station, a polling message including the identity of the optical network unit and an indication of a quantity of data that the identified optical network unit is permitted to send to the head-end station, and transmitting the polling message over the optical waveguide;

(2) on receiving the polling message, the optical network unit identified therein transmitting to the head-end station, over said optical waveguide, a quantity of data less than or equal to the permitted quantity indicated by said polling message;

(3) said optical network unit generating a request message indicating a quantity of data intended for transmission from said optical network unit to the head-end station, and transmitting the request message to the head-end station over the optical waveguide;

wherein the quantity of data indicated by said request message is calculated by the optical network unit using at least one measurement of buffer fullness in combination with at least one indication of a permitted quantity of data.

* * * * *